United States Patent
Aso

(10) Patent No.: US 9,174,643 B2
(45) Date of Patent: Nov. 3, 2015

(54) VEHICLE CONTROL DEVICE, VEHICLE CONTROL METHOD, AND VEHICLE CONTROL SYSTEM

(75) Inventor: Makoto Aso, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 13/387,306

(22) PCT Filed: Jul. 28, 2009

(86) PCT No.: PCT/JP2009/063428
§ 371 (c)(1),
(2), (4) Date: Mar. 1, 2012

(87) PCT Pub. No.: WO2011/013203
PCT Pub. Date: Feb. 3, 2011

(65) Prior Publication Data
US 2012/0166059 A1  Jun. 28, 2012

(51) Int. Cl.
*B60W 30/17* (2012.01)
*G08G 1/00* (2006.01)
*G08G 1/01* (2006.01)
(Continued)

(52) U.S. Cl.
CPC .............. *B60W 30/16* (2013.01); *G08G 1/161* (2013.01); *G08G 1/22* (2013.01)

(58) Field of Classification Search
CPC .... B60W 30/16; B60W 30/165; G08G 1/161; G08G 1/22
USPC ........................................................ 709/245
See application file for complete search history.

(56) References Cited

U.S. PATENT DOCUMENTS

| 5,134,393 A | 7/1992 | Henson |
| 6,032,097 A * | 2/2000 | Iihoshi et al. ................... 701/96 |
| 6,289,278 B1 | 9/2001 | Endo et al. |

(Continued)

FOREIGN PATENT DOCUMENTS

| JP | A-10-162282 | 6/1998 |
| JP | A-11-250396 | 9/1999 |

(Continued)

OTHER PUBLICATIONS

International Preliminary Report on Patentability issued in Application No. PCT/JP2009/063428; Dated Nov. 11, 2011 (With Translation).

(Continued)

*Primary Examiner* — Helal A Algahaim
*Assistant Examiner* — Charles J Han
(74) *Attorney, Agent, or Firm* — Oliff PLC

(57) ABSTRACT

When a preceding vehicle in front of a host vehicle reduces speed, other vehicles between the preceding vehicle and a system-mounted vehicle successively reduces speed. An ECU and an ACC control the traveling of the system-mounted vehicle on the basis of prediction information of speed reduction propagation when the system-mounted vehicle reduces speed such that the system-mounted vehicle and an ordinary vehicle immediately in front of the system-mounted vehicle have a predetermined relative positional relationship. Therefore, it is possible to suppress the speed reduction propagation between the preceding vehicle and the system-mounted vehicle in advance, making it possible to more effectively suppress congestion.

12 Claims, 22 Drawing Sheets

(51) Int. Cl.
*B60W 30/16* (2012.01)
*G08G 1/16* (2006.01)

(56) References Cited

U.S. PATENT DOCUMENTS

| | | | |
|---|---|---|---|
| 6,597,981 | B2 | 7/2003 | Nishira et al. |
| 2002/0069010 | A1* | 6/2002 | Nishira et al. .................. 701/96 |
| 2002/0176605 | A1 | 11/2002 | Stafsudd et al. |
| 2004/0078133 | A1 | 4/2004 | Miller et al. |
| 2004/0193372 | A1 | 9/2004 | MacNeille et al. |
| 2004/0258064 | A1 | 12/2004 | Nakamura et al. |
| 2006/0195250 | A1 | 8/2006 | Kawaguchi |
| 2007/0027610 | A1 | 2/2007 | Parikh et al. |
| 2007/0083318 | A1 | 4/2007 | Parikh |
| 2007/0244614 | A1 | 10/2007 | Nathanson |
| 2009/0245247 | A1 | 10/2009 | Nakamura et al. |
| 2012/0123660 | A1 | 5/2012 | Kagawa et al. |
| 2012/0166059 | A1 | 6/2012 | Aso |

FOREIGN PATENT DOCUMENTS

| | | |
|---|---|---|
| JP | A-2002-137652 | 5/2002 |
| JP | A-2006-309736 | 11/2006 |
| JP | A-2007-102564 | 4/2007 |
| JP | A-2008-059094 | 3/2008 |
| JP | A-2008-090587 | 4/2008 |
| JP | A-2008-094167 | 4/2008 |
| JP | A-2008-222123 | 9/2008 |
| JP | A-2008-232391 | 10/2008 |

OTHER PUBLICATIONS

International Search Report issued in Application No. PCT/JP2009/063428; Dated Aug. 25, 2009 (With Translation).
Office Action dated Feb. 10, 2014 issued in U.S. Appl. No. 13/386,794.
Jun. 4, 2015 Office Action issued in U.S. Appl. No. 13/386,794.
Mar. 23, 2015 Office Action issued in U.S. Appl. No. 13/386,794.
Nov. 21, 2014 Office Action issued in U.S. Appl. No. 13/386,794.
Office Action dated Jun. 30, 2014 issued in U.S. Appl. No. 13/386,794.
Advisory Action dated Sep. 10, 2014 issued in U.S. Appl. No. 13/386,794.

* cited by examiner

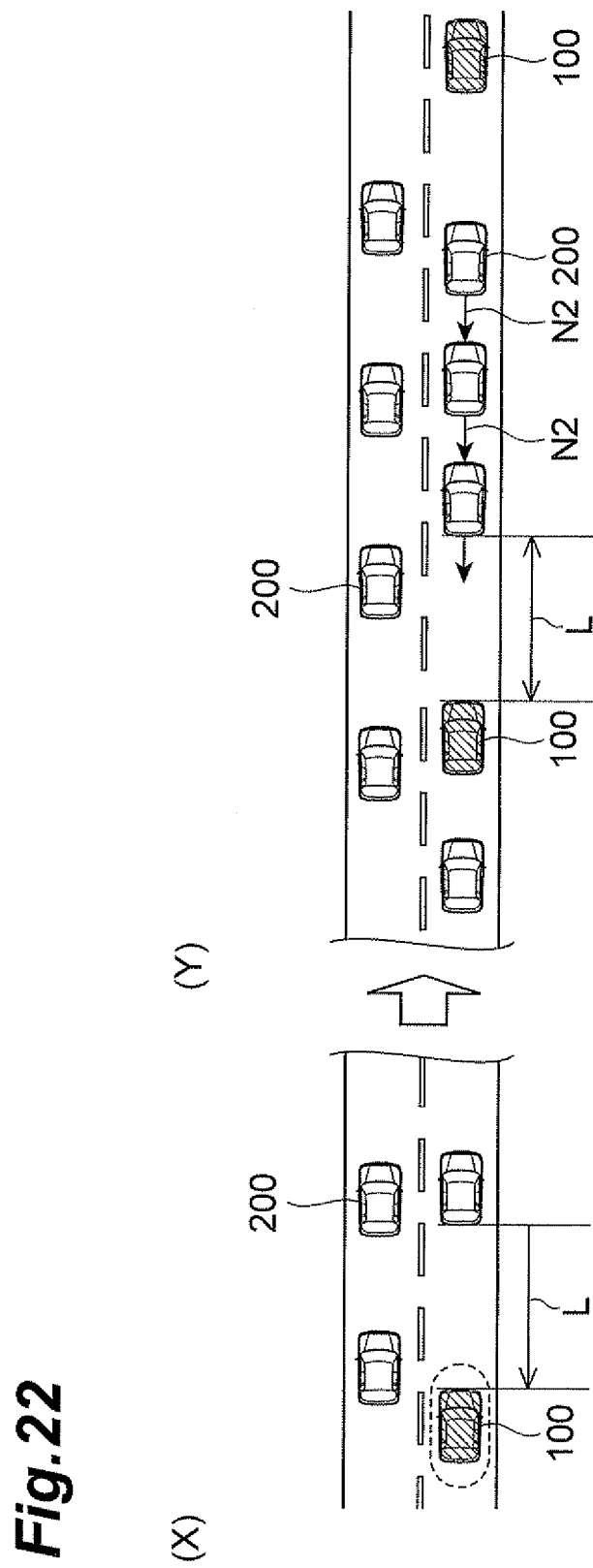

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system. In particular, the present invention relates to a vehicle control device, a vehicle control method, and a vehicle control system for improving a traffic flow on a road.

BACKGROUND ART

In the related art, there has been an attempt to control the traveling of an individual vehicle to improve a traffic flow on a road, thereby reducing traffic congestion. For example, Patent Literature 1 describes a preceding vehicle follow-up device which detects a change in the gradient of a traveling road ahead, and if a change in the gradient of the traveling road ahead is detected near a sag (a change point on a road from downhill to uphill) or the like, and performs switching from inter-vehicle distance control to vehicle speed control. In the preceding vehicle follow-up device of Patent Literature 1, the inter-vehicle distance control is switched to the vehicle speed control near the sag, thereby suppressing a variation in the vehicle speed during preceding vehicle follow-up control. In particular, the preceding vehicle follow-up device of Patent Literature 1 prevents a phenomenon in which a variation in the vehicle speed of the preceding vehicle is amplified and propagated to a succeeding vehicle.

CITATION LIST

Patent Literature

[Patent Literature 1] Japanese Unexamined Patent Application Publication No. 2002-137652

SUMMARY OF INVENTION

Technical Problem

However, in the above-described technique, even when switching to the vehicle speed control is done at a sag, it is difficult to avoid speed reduction propagation in which the speed reduction of a preceding vehicle propagates to a succeeding vehicles, and if vehicles are successively traveling, speed reduction in succeeding vehicles increases. In the above-described technique, even when switching to the vehicle speed control is done immediately before the sag, if the speed reduction propagation occurs, in order to prevent the inter-vehicle distance from being too close, the inter-vehicle distance control may be returned. Accordingly, in the above-described technique, since the vehicle speed control is returned to the inter-vehicle distance control when the speed reduction propagation has occurred, a congestion state is caused in which a plurality of vehicles at a low speed are traveling in lines, making it difficult to effectively suppress congestion.

The invention has been finalized in consideration of the above-described situation, and an object of the invention is to provide a vehicle control device, a vehicle control method, and a vehicle control system capable of more effectively suppressing congestion.

Solution to Problem

However, in the above-described technique, even when switching to the vehicle speed control is done at a sag, it is difficult to avoid speed reduction propagation in which the speed reduction of a preceding vehicle propagates to a succeeding vehicles, and if vehicles are successively traveling, speed reduction in succeeding vehicles increases. In the above-described technique, even when switching to the vehicle speed control is done immediately before the sag, if the speed reduction propagation occurs, in order to prevent the inter-vehicle distance from being too close, the inter-vehicle distance control may be returned. Accordingly, in the above-described technique, since the vehicle speed control is returned to the inter-vehicle distance control when the speed reduction propagation has occurred, a congestion state is caused in which a plurality of vehicles at a low speed are traveling in lines, making it difficult to effectively suppress congestion.

The invention has been finalized in consideration of the above-described situation, and an object of the invention is to provide a vehicle control device, a vehicle control method, and a vehicle control system capable of more effectively suppressing congestion.

Solution to Problem

The invention provides a vehicle control device including information acquisition means for acquiring prediction information of speed reduction propagation when a preceding vehicle in front of a host vehicle reduces speed, such that other vehicles between the preceding vehicle and the host vehicle successively reduces speed, and the host vehicle then reduces speed, and traveling control means for controlling the traveling of the host vehicle on the basis of the prediction information acquired by the information acquisition means such that the host vehicle and another vehicle traveling immediately in front of the host vehicle have a predetermined relative positional relationship.

With this configuration, on the basis of the prediction information of the speed reduction propagation when the preceding vehicle in front of the host vehicle reduces speed, such that other vehicles between the preceding vehicle and the host vehicle reduces speed, and the host vehicle then reduces speed, the traveling control means controls the traveling of the host vehicle such that the host vehicle and another vehicle traveling in front of the host vehicle have the predetermined relative positional relationship. Therefore, it is possible to suppress the speed reduction propagation between the preceding vehicle and the host vehicle in advance, making it possible to more effectively suppress congestion.

In this case, the vehicle control device may further include receiving means for receiving information relating to the speed reduction of the preceding vehicle from the preceding vehicle.

With this configuration, the information relating to the speed reduction of the preceding vehicle can be received from the preceding vehicle by the receiving means. Therefore, it is possible to know the movement of the preceding vehicle before the speed reduction propagation occurs, and with the cooperation of the preceding vehicle and the host vehicle, it becomes possible to more effectively suppress congestion.

On the basis of the deceleration of other vehicles between the preceding vehicle and the host vehicle, the traveling control means may perform switching from control such that the host vehicle and another vehicle traveling immediately in front of the host vehicle have the predetermined relative positional relationship to control such that the inter-vehicle distance from another vehicle immediately in front of the host vehicle is maintained at a predetermined distance.

With this configuration, on the basis of the deceleration of other vehicles between the preceding vehicle and the host vehicle, the traveling control means performs switching from control such that the host vehicle and another vehicle traveling immediately in front of the host vehicle have the predetermined relative positional relationship to control such that the inter-vehicle distance from another vehicle immediately in front of the host vehicle is maintained at a predetermined distance. Therefore, when another vehicle traveling immediately in front has reduced speed beyond the scope of the assumption, it is possible to appropriately maintain the inter-vehicle distance.

When the speed reduction of the preceding vehicle is detected, the traveling control means may control the traveling of the host vehicle such that the host vehicle reduces speed at a deceleration lower than the preceding vehicle.

With this configuration, when the speed reduction of the preceding vehicle is detected, the traveling control means controls the traveling of the host vehicle such that the host vehicle reduces speed at a deceleration lower than the preceding vehicle. Therefore, it is possible to absorb the speed reduction propagation between the preceding vehicle and the host vehicle, making it possible to more effectively suppress congestion.

In this case, the vehicle control device may further include transmitting means for transmitting information relating to the speed reduction of the host vehicle to a succeeding vehicle behind the host vehicle.

With this configuration, the information relating to the speed reduction of the host vehicle can be transmitted to the succeeding vehicle behind the host vehicle by the transmitting means. Therefore, the succeeding vehicle uses the information relating to the speed reduction of the host vehicle, thereby more effectively suppressing the occurrence of congestion due to the speed reduction propagation.

The invention also provides a vehicle control method including the steps of acquiring prediction information of speed reduction propagation when a preceding vehicle in front of a host vehicle reduces speed, such that other vehicles between the preceding vehicle and the host vehicle successively reduces speed, and the host vehicle then reduces speed, and controlling the traveling of the host vehicle on the basis of the prediction information acquired in the step of acquiring the prediction information of the speed reduction propagation such that the host vehicle and another vehicle traveling immediately in front of the host vehicle have a predetermined relative positional relationship.

In this case, the vehicle control method may further include the step of receiving information relating to the speed reduction of the preceding vehicle from the preceding vehicle.

In the step of controlling the traveling of the host vehicle, switching may be performed on the basis of the decelerations of other vehicles between the preceding vehicle and the host vehicle from control such that the host vehicle and another vehicle traveling immediately in front of the host vehicle have the predetermined relative positional relationship to a control such that the inter-vehicle distance from another vehicle immediately in front of the host vehicle is maintained at a predetermined distance.

In the step of controlling the traveling of the host vehicle, when the speed reduction of the preceding vehicle is detected, the traveling of the host vehicle may be controlled such that the host vehicle reduces speed at a deceleration lower than the preceding vehicle.

In this case, the vehicle control method may further include the step of transmitting information relating to the speed reduction of the host vehicle to a succeeding vehicle behind the host vehicle.

The invention also provides a vehicle control system including information acquisition means for acquiring prediction information of speed reduction propagation when a preceding vehicle in front of a vehicle reduces speed, such that other vehicles between the preceding vehicle and the vehicle successively reduces speed, and the vehicle then reduces speed, and traveling control means for controlling the traveling of the vehicle on the basis of the prediction information acquired by the information acquisition means such that the vehicle and another vehicle traveling immediately in front of the vehicle have a predetermined relative positional relationship.

In this case, the vehicle control system may further include receiving means for receiving information relating to the speed reduction of the preceding vehicle from the preceding vehicle.

On the basis of the decelerations of other vehicles between the preceding vehicle and the vehicle, the traveling control means may perform switching from control such that the vehicle and another vehicle traveling immediately in front of the vehicle have the predetermined relative positional relationship to control such that the inter-vehicle distance from another vehicle immediately in front of the vehicle is maintained at a predetermined distance.

When the speed reduction of the preceding vehicle is detected, the traveling control means may control the traveling of the vehicle such that the vehicle reduces speed at a deceleration lower than the preceding vehicle.

In this case, the vehicle control system may further include transmitting means for transmitting information relating to the speed reduction of the vehicle to a succeeding vehicle behind the vehicle.

Advantageous Effects of Invention

According to the vehicle control device, the vehicle control method, and the vehicle control system of the invention, it becomes possible to more effectively suppress congestion.

BRIEF DESCRIPTION OF DRAWINGS

FIGS. 22(X) and 22(Y) are plan views showing absorption of speed reduction propagation due to an ordinary vehicle.

DESCRIPTION OF EMBODIMENTS

Figure 1:
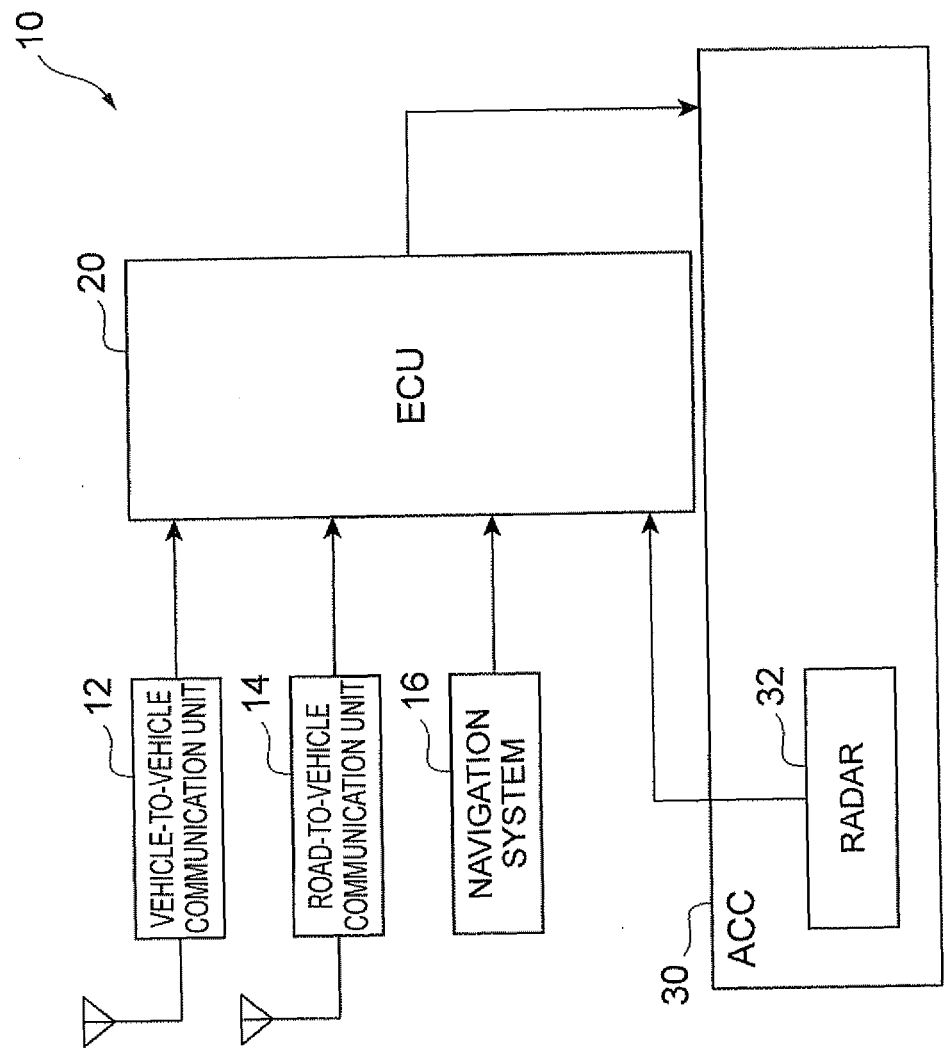
FIG. 1 is a block diagram showing the configuration of a vehicle control device according to an embodiment.

Hereinafter, a vehicle control device according to an embodiment of the invention will be described with reference to the drawings. The vehicle control device of this embodiment is mounted in a vehicle, and used to perform vehicle control for improving the traffic flow on a road. As shown in FIG. 1, a vehicle control device 10 of this embodiment includes a vehicle-to-vehicle communication unit 12, a road-to-vehicle communication unit 14, a navigation system 16, an ECU (Electronic Control Unit) 20, and an ACC (Adaptive Cruise Control) 30.

The vehicle-to-vehicle communication unit 12 is used to transmit or receive information on the position and speed of a system-mounted vehicle other than a host vehicle or whether a vehicle control for preventing congestion is ON or OFF through vehicle-to-vehicle communication.

The road-to-vehicle communication unit 14 is used to receive information on the traffic flow on a road, the vehicle speed of a vehicle traveling on the road, or the like from road-side facilities, such as an optical beacon communication unit. In this embodiment, the road-to-vehicle communication unit 14 may not be provided.

The navigation system 16 includes a GPS which receives signals from a plurality of GPS (Global Positioning System) satellites by a GPS receiver and measures the position of the host vehicle from the difference between the signals, and a map information DB (Data Base) which stores map information in the host vehicle. The navigation system 16 is used to perform the route guidance of the host vehicle and also to acquire information relating to a place, such as a sag in front of the host vehicle, at which the reduction in the vehicle speed is caused. For example, the navigation system 16 detects the relative position of the host vehicle with respect to the sag and outputs the relative position to the ECU 20.

The ECU 20 receives information relating to the relative position of the host vehicle with respect to the sag from the navigation system 16 and information relating to the relative position and the relative speed of another vehicle around the host vehicle from a radar 32 of the ACC 30 as input. The ECU outputs traveling control command values, such as a target vehicle speed, an acceleration G, and a target inter-vehicle distance, to the ACC 30 on the basis of information input from the navigation system 16 and the ACC 30.

The ACC 30 has a radar 32 which detects the relative position and the relative speed of another vehicle around the host vehicle. The ACC 30 performs traveling control on the basis of the traveling control command values from the ECU 20 such that the host vehicle has the target vehicle speed, the acceleration G, and the target inter-vehicle distance.

Figure 19:
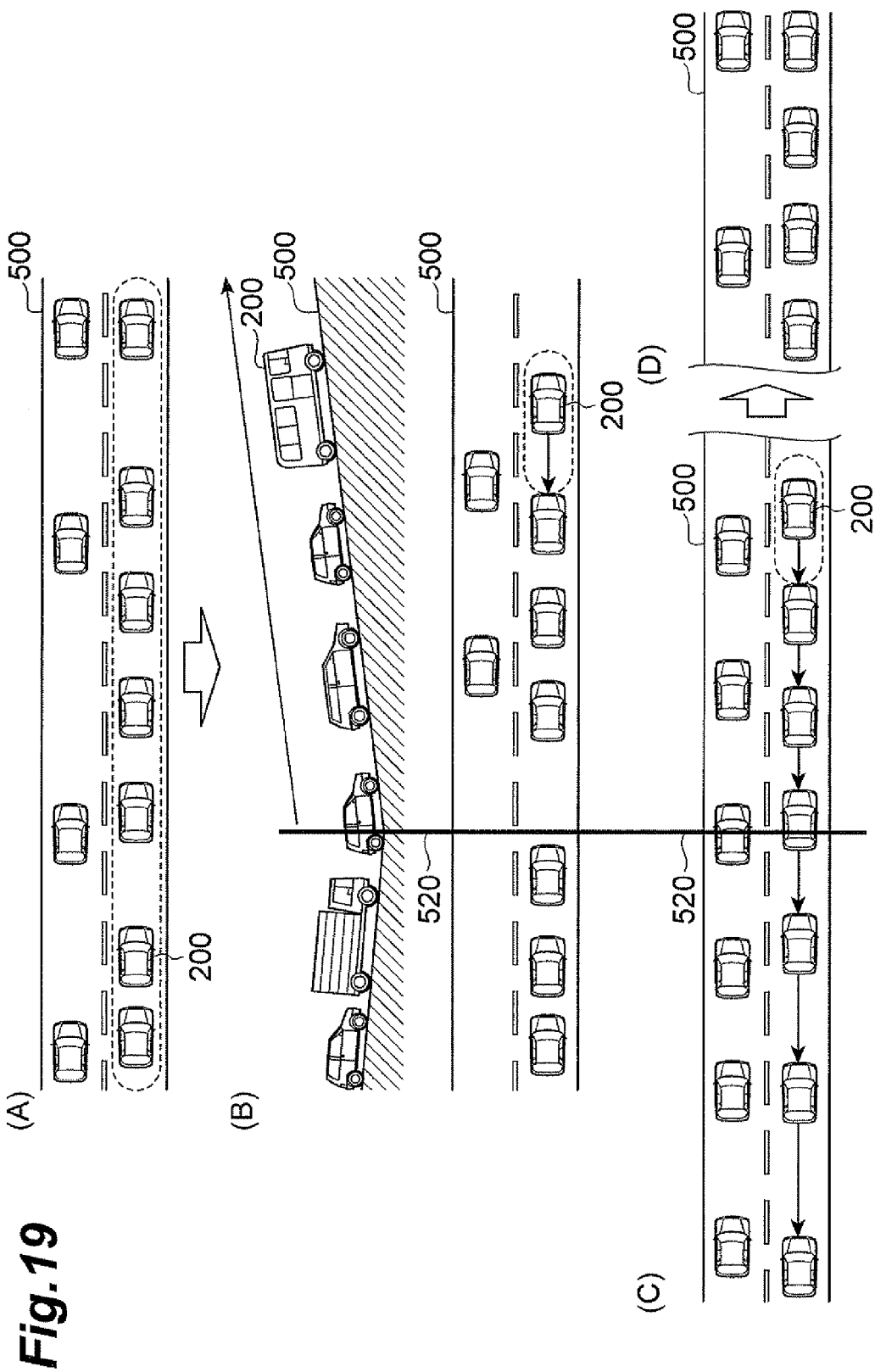
FIGS. 19(A) to 19(D) are diagrams showing a process in which congestion occurs near a sag.

Hereinafter, the operation of the vehicle control device 10 of this embodiment will be described. First, as a premise, the reason for which congestion occurs at a sag or the like will be described. As shown in FIG. 19(A), it is assumed that ordinary vehicles 200 in which the vehicle control device 10 of this embodiment is not mounted are traveling on a road 500 in a cascaded manner. A traffic flow increases, an inter-vehicle distance becomes close, and the vehicle speed of each of the ordinary vehicles 200 is reduced by about 10 km/h. In this case, as shown in a broken-line portion of the drawing, since a vehicle which is reluctant to reduce vehicle speed makes a lane change to a passing lane, in particular, a decrease in the inter-vehicle distance in the passing lane becomes conspicuous.

As shown in FIG. 19(B), the ordinary vehicle 200 which passes through a sag 520 and inconspicuously reduces speed at an uphill section becomes a cause of congestion. Alternatively, unreasonable cutting-in of a truck or the like becomes a cause of congestion. As shown in FIG. 19(C), if the inter-vehicle distance becomes close due to the speed reduction of the preceding ordinary vehicle 200, the succeeding ordinary vehicle 200 reduces speed so as to maintain the inter-vehicle distance with respect to the preceding vehicle. In this case, since the succeeding vehicle should reduce speed to a speed lower than the preceding vehicle, speed reduction propagation occurs in which speed reduction propagates from the preceding vehicle to the succeeding vehicle while being amplified, thereby causing congestion.

As shown in FIG. 19(D), even after having passed through the sag 520 causing congestion, the inter-vehicle distance between the ordinary vehicles 200 becomes close, and it is difficult to increase speed. For this reason, speed recovery after speed reduction is delayed, and congestion is continued.

Figure 20:
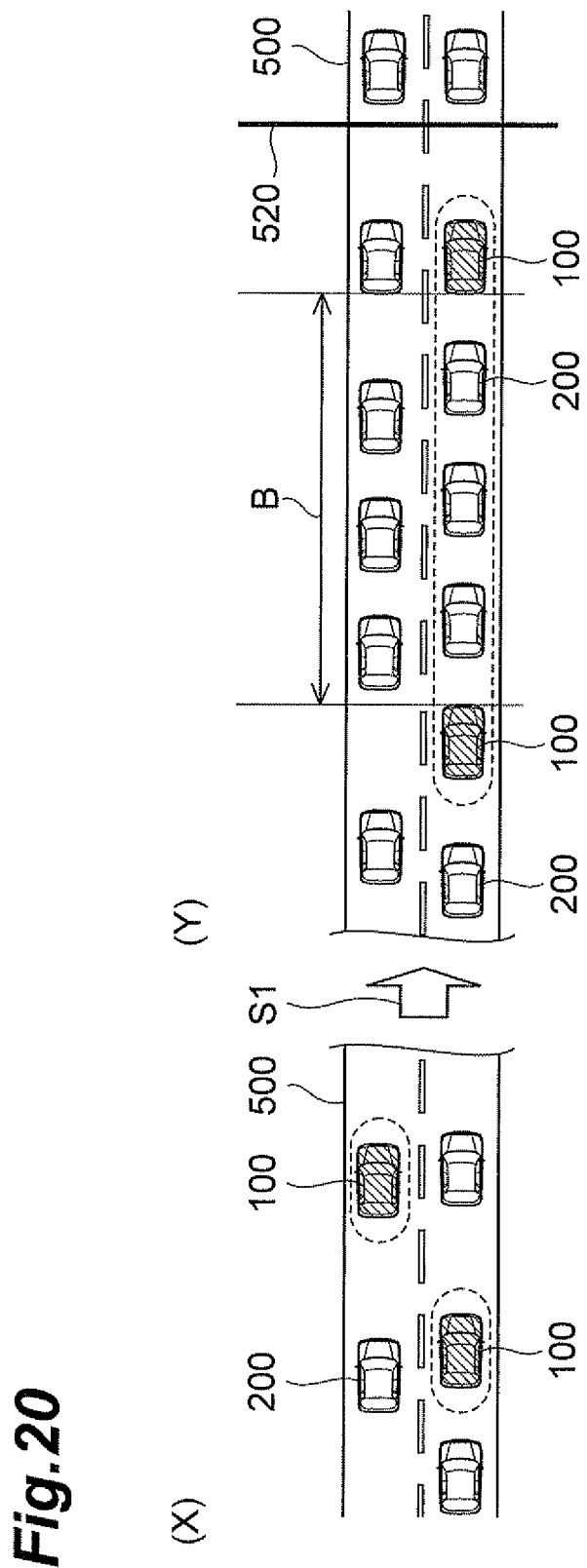
FIGS. 20(X) and 20(Y) are plan views showing an example where an efficient flow is produced.

When producing an efficient traffic flow and guiding a vehicle to a region B where the best traffic flow is obtained, as shown in FIG. 20(X), on the road 500 on which system-mounted vehicles 100 having the vehicle control device 10 of this embodiment mounted therein and ordinary vehicles 200 are traveling in a mixed manner, the system-mounted vehicles 100 start traveling control from 5 km in front of the sag 520 such that the vehicle speed and the inter-vehicle distance become a region where the best traffic flow can be obtained. Next, as shown in FIG. 20(Y), from 1 km in front of the sag 520 to the sag 520, the vehicle speed and the inter-vehicle distance are maintained such that the best traffic flow can be obtained. Thus, as shown in a broken-line portion of the drawing, it is thought that vehicles including ordinary vehicles can belong to the region of the vehicle speed and the inter-vehicle distance where the best traffic flow can be obtained.

Figure 21:
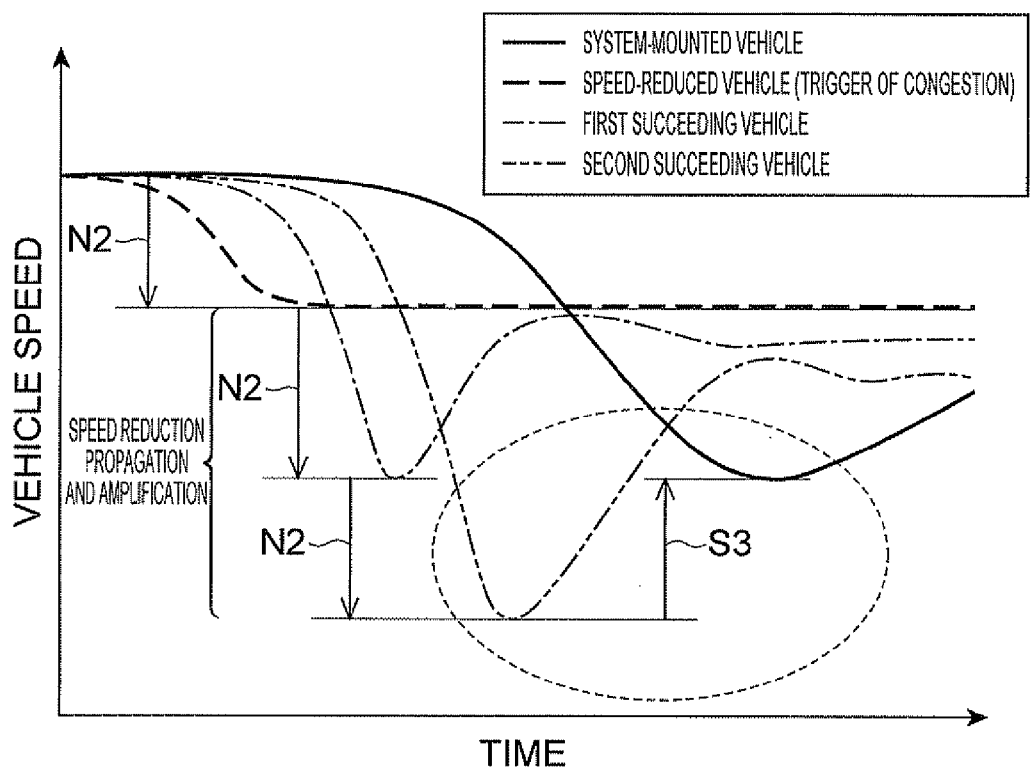
FIG. 21 is a graph showing changes in the vehicle speed of a speed-reduced vehicle, a succeeding vehicle, and a system-mounted vehicle at the time of congestion.

A method of returning a vehicle having entered a congestion region to the region of the vehicle speed and the inter-vehicle distance where the best traffic flow can be obtained is considered. As shown in FIG. 21, speed reduction propagation from a speed-reduced vehicle as the trigger of congestion to a first succeeding vehicle and a second succeeding vehicle is advanced while amplifying a deceleration. Accordingly, as shown in FIG. 22(X), the system-mounted vehicle 100 succeeding the ordinary vehicle 200, such as a speed-reduced vehicle, causing speed reduction propagation leaves an inter-vehicle distance L, at which the speed reduction propagation is absorbable, in advance. Thus, as shown in FIG. 22(Y), even when speed reduction propagation has occurred from the preceding vehicle, the speed reduction propagation is absorbed by the inter-vehicle distance L in front of the system-mounted vehicle 100, making it possible to return a vehicle having temporarily entered the congestion region to the region of the vehicle speed and the inter-vehicle distance where the best traffic flow can be obtained. Therefore, in this embodiment, congestion is prevented by the following operation.

Figure 2:
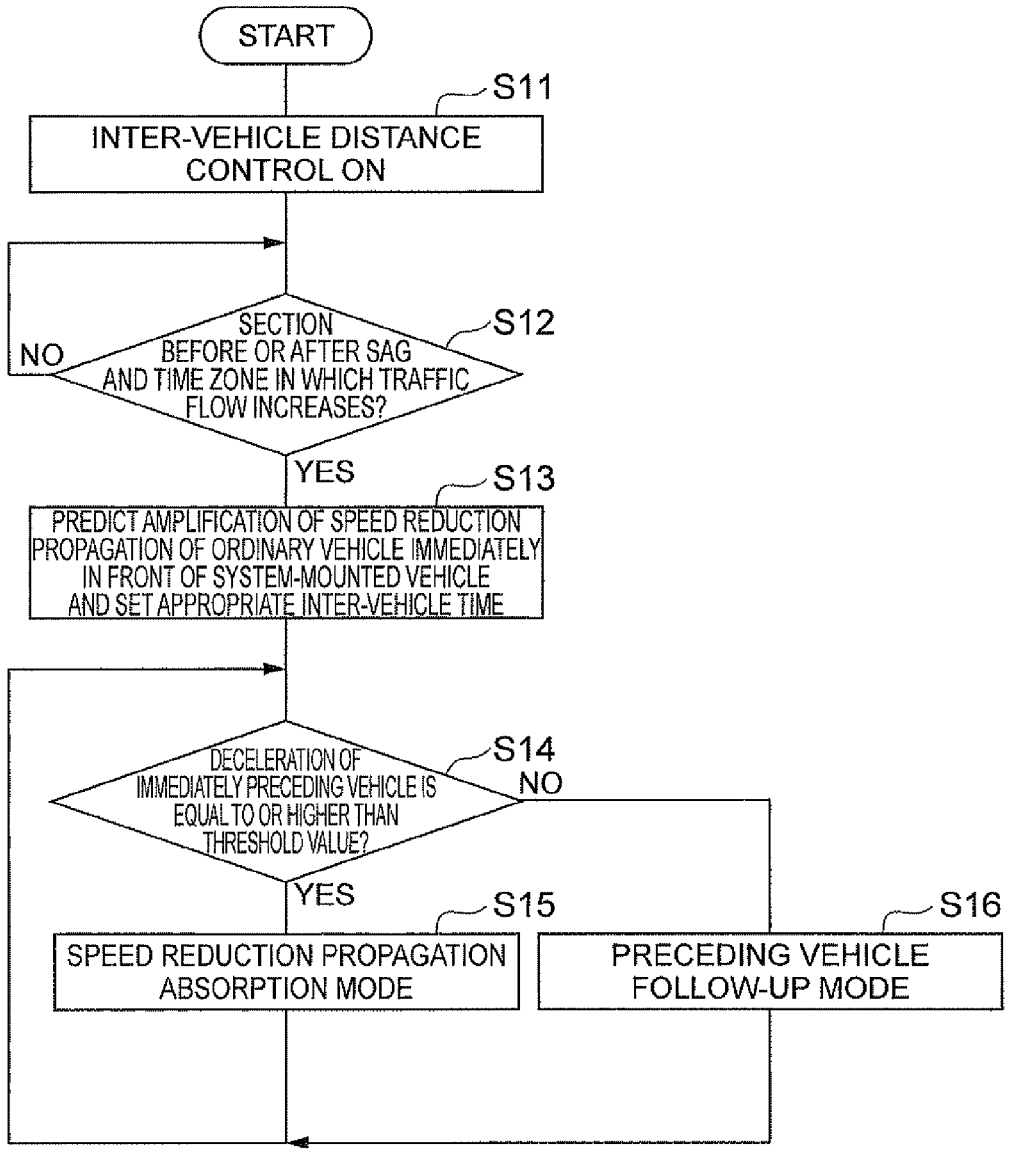
FIG. 2 is a flowchart showing the operation of a vehicle control device according to the embodiment.

Hereinafter, the operation of the vehicle control device 10 of this embodiment will be described. As shown in FIG. 2, inter-vehicle distance control by the ACC 30 is turned on (S11). When the system-mounted vehicle 100 travels through a section before and after the sag 520, and it is the time zone in which the traffic flow increases (S12), the ECU 20 predicts amplification of speed reduction propagation due to the ordinary vehicle 200 immediately in front of the system-mounted vehicle 100, and sets an appropriate inter-vehicle time with respect to the immediately preceding ordinary vehicle 200 (S13). When the deceleration of the immediately preceding ordinary vehicle 200 is equal to or higher than a threshold value (S14), the ECU 20 allows the ACC 30 to perform traveling control in a speed reduction propagation absorption mode for absorbing speed reduction propagation (S15). When the deceleration of the immediately preceding ordinary vehicle 200 is lower than the threshold value (S14), the ECU 20 allows the ACC 30 to perform traveling control in a preceding vehicle follow-up mode for traveling to follow the normal preceding vehicle (S16).

Figure 3:
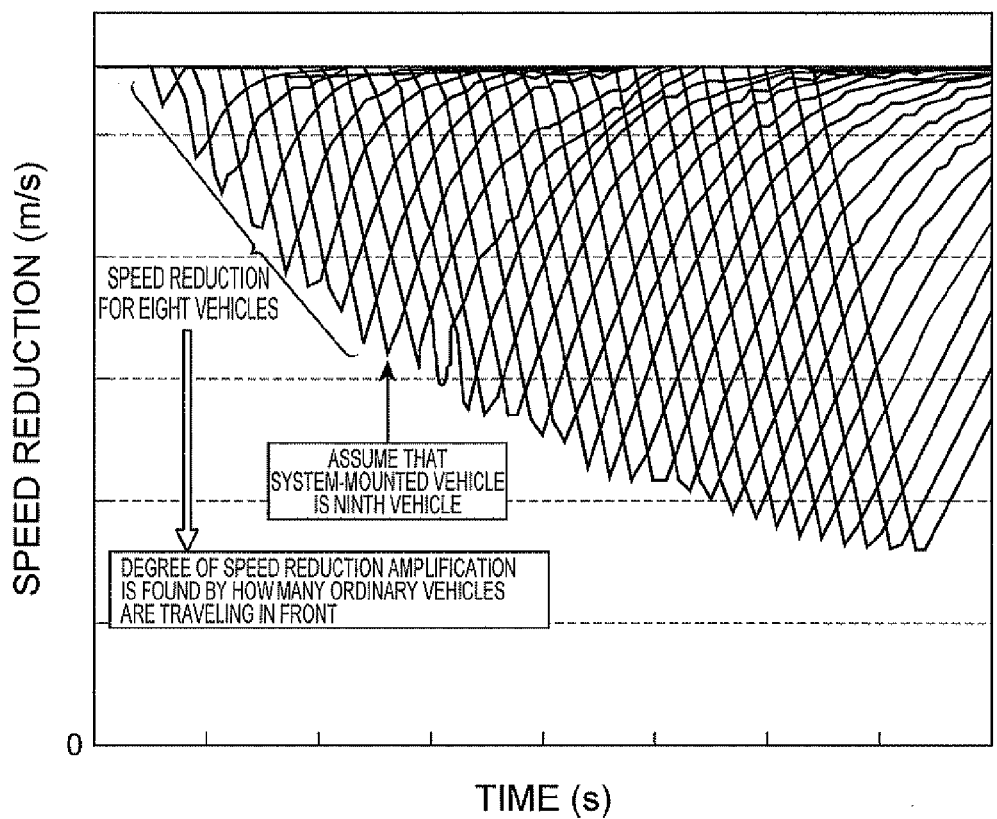
FIG. 3 is a graph showing amplification of a deceleration due to speed reduction propagation of an ordinary vehicle.

As shown in FIG. 3, the degree of amplification of a deceleration per vehicle in the speed reduction propagation can be calculated by a simulation or the like. For example, it is assumed that the system-mounted vehicle 100 succeeds eight vehicles, and is the ninth vehicle from the lead vehicle. In this case, the degree of amplification of a deceleration for eight vehicles can be estimated from the graph of FIG. 3. For this reason, if it is found how many vehicles are traveling in front of the system-mounted vehicle 100, it is possible to determine the degree of amplification of a deceleration as a whole.

Figure 4:
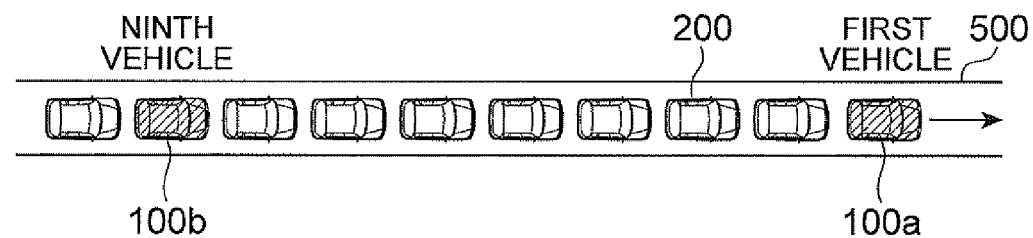
FIG. 4 is a graph showing prediction of absorption of speed reduction propagation according to the embodiment.
Figure 4:
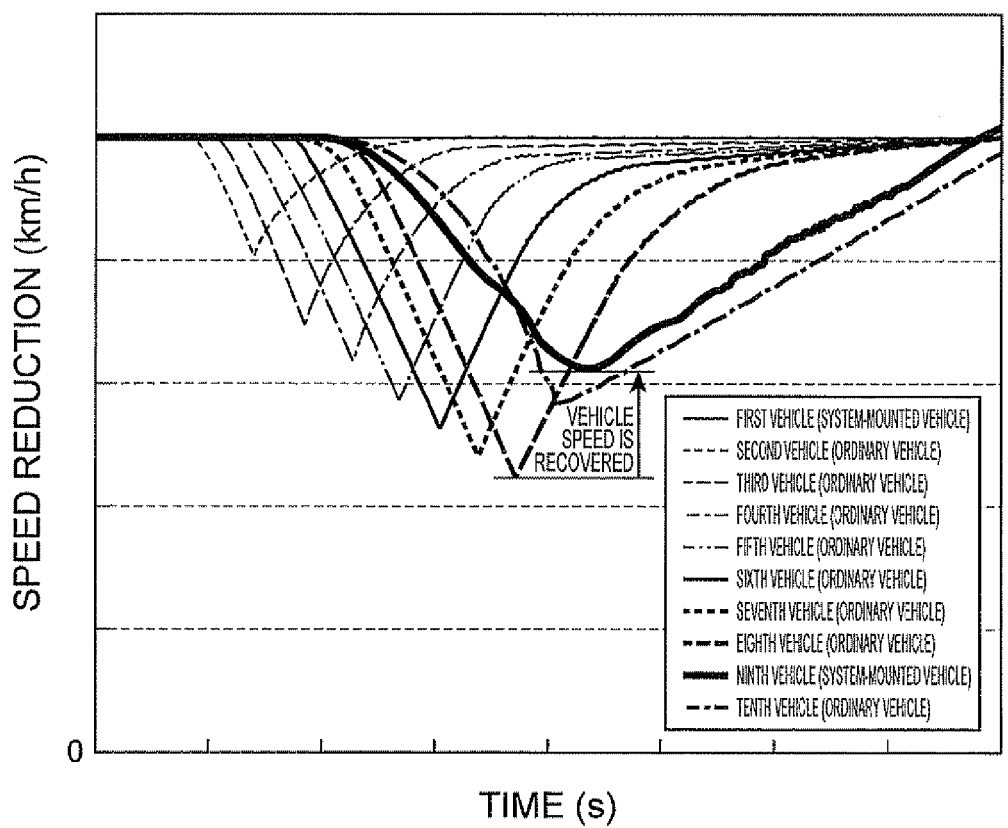

For example, when the first vehicle is a system-mounted vehicle 100a, the second to eighth vehicles are ordinary vehicles 200, and the ninth vehicle is a system-mounted vehicle 100b, the prediction of the inter-vehicle distance for absorbing speed reduction propagation can be estimated as shown in FIG. 4. In this way, with the pre-simulation, it is possible to predict a necessary inter-vehicle distance or minimum speed by how many ordinary vehicles 200 are between the system-mounted vehicles 100a and 100b.

Figure 5:
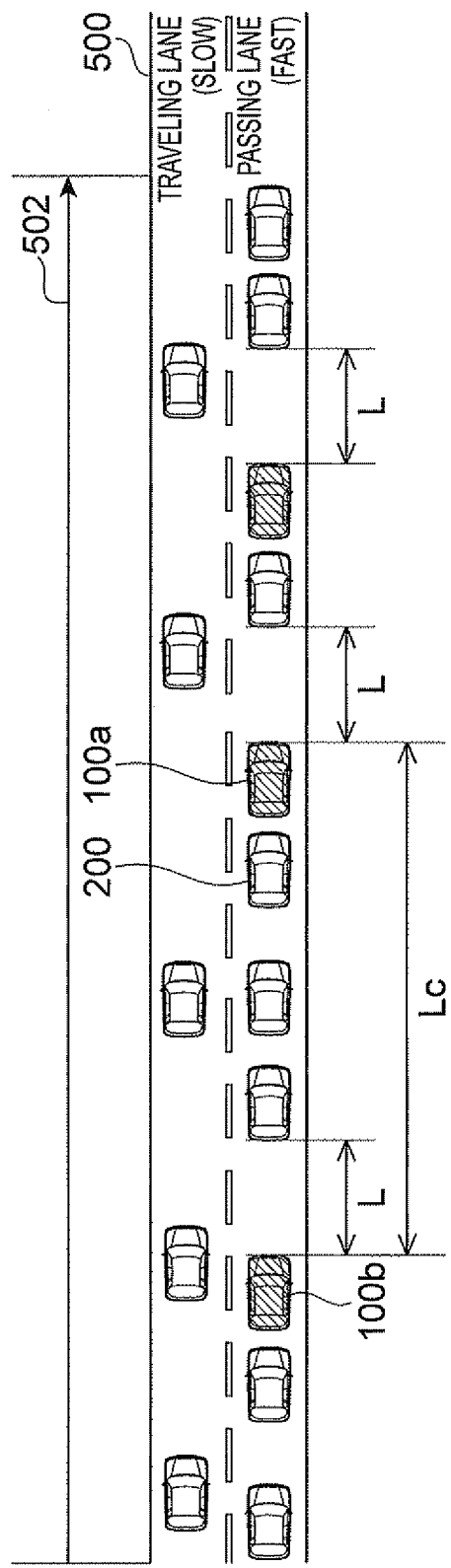
FIG. 5 is a plan view showing a method of determining an adequate inter-vehicle distance for absorbing speed reduction propagation.

Hereinafter, a method of determining an appropriate inter-vehicle distance capable of absorbing speed reduction propagation will be described. As shown in FIG. 5, it is assumed that, on a road 500 on which an uphill 502 is continued, the system-mounted vehicle 100a is in the lead, several ordinary vehicles 200 succeed the system-mounted vehicle 100a, and the system-mounted vehicle 100b is at the end. Let the inter-vehicle distance between the system-mounted vehicles 100a and 100b be $L_c$ and an inter-vehicle distance capable of absorbing speed reduction propagation be L. Let the predicted number of ordinary vehicles 200 between the system-mounted vehicles 100a and 100b be N, the speed of the preceding system-mounted vehicle 100a be $V_p$ [km/h], and the average inter-vehicle time of the ordinary vehicles 200 be $T_N$, for example, 1.8 seconds.

Figure 6:
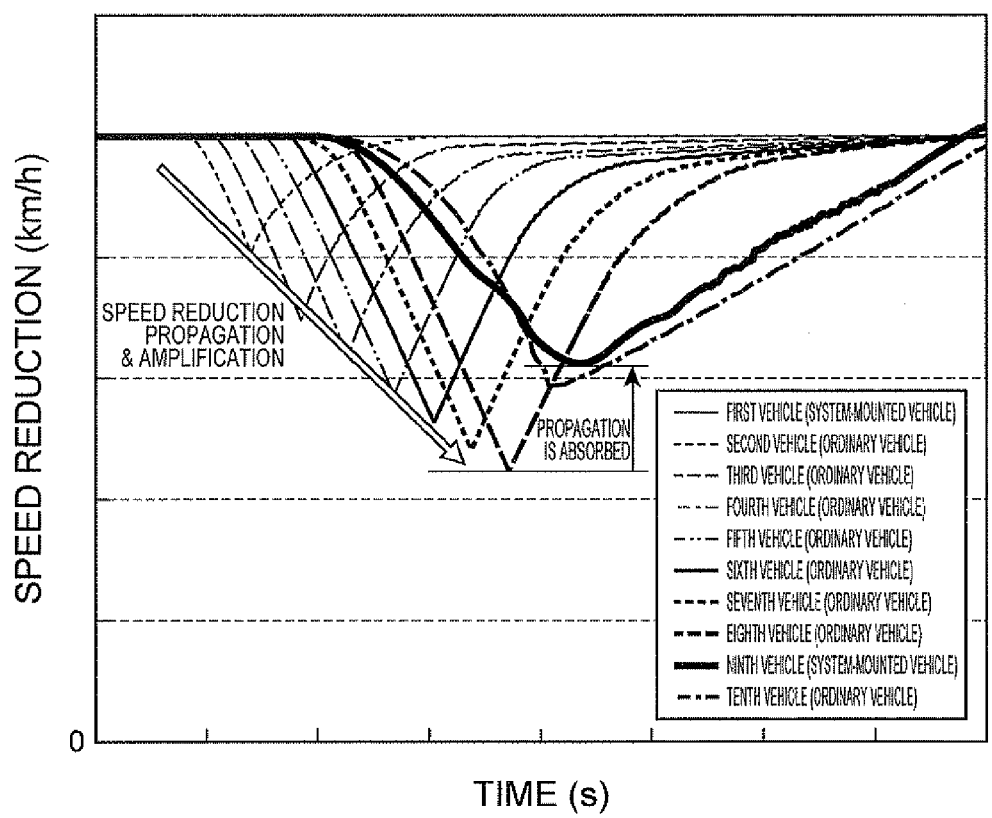
FIG. 6 is a graph showing speed reduction propagation, amplification of a deceleration due to speed reduction propagation, and absorption of speed reduction propagation.

In this case, the number of ordinary vehicles 200 between the preceding system-mounted vehicle 100a and the last system-mounted vehicle 100b is predicted, and the target inter-vehicle time $T_L$ [seconds] according to the number of ordinary vehicles 200 is determined. Thus, as shown in FIG. 6, it is possible to absorb speed reduction propagation due to the preceding ordinary vehicles 200.

Figure 7:
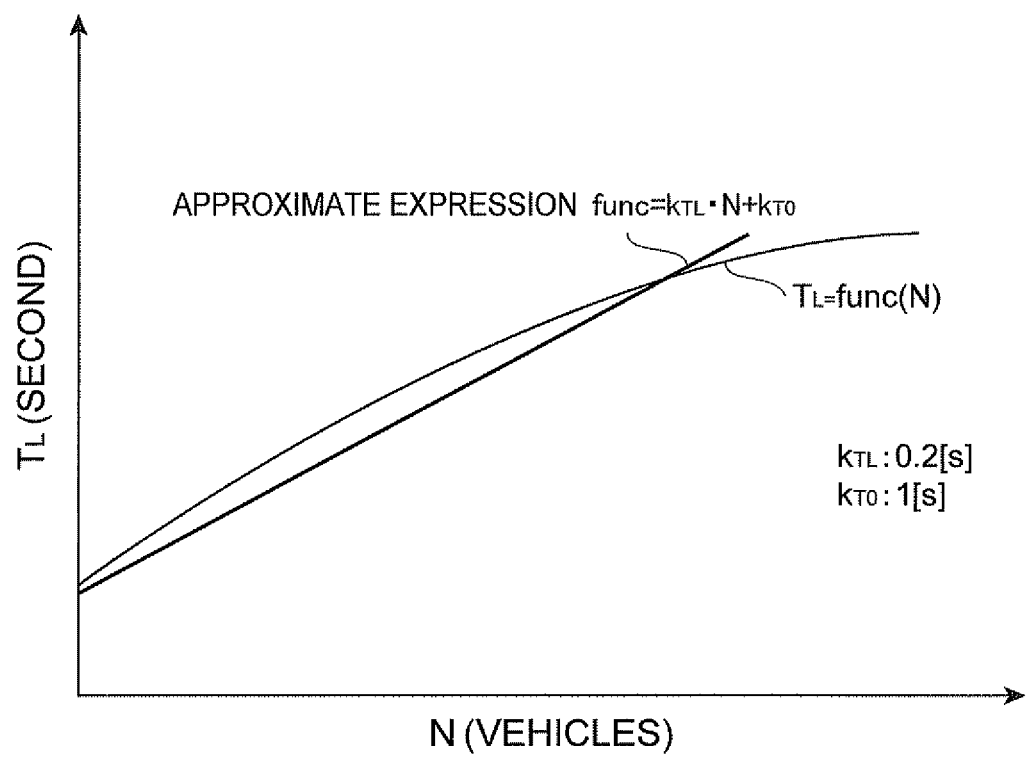
FIG. 7 is a graph showing a function of obtaining a target inter-vehicle time for which speed reduction propagation is absorbed and an approximate expression thereof.

Here, $N=(L_c-L)/(T_N \cdot V_p)$ and $T_L$=func(N) can be established. $T_L$=func(N) is the function of $T_L$ with respect to N shown in FIG. 7, and can be approximated to, for example, func(N)=$k_{TL} \cdot N + k_{T0}$. Here, $k_{TL}$ and $k_{T0}$ can be determined in advance by a simulation, and can be, for example, $k_{TL}$=0.2 [seconds] and $k_{T0}$=1 [second].

Figure 8:
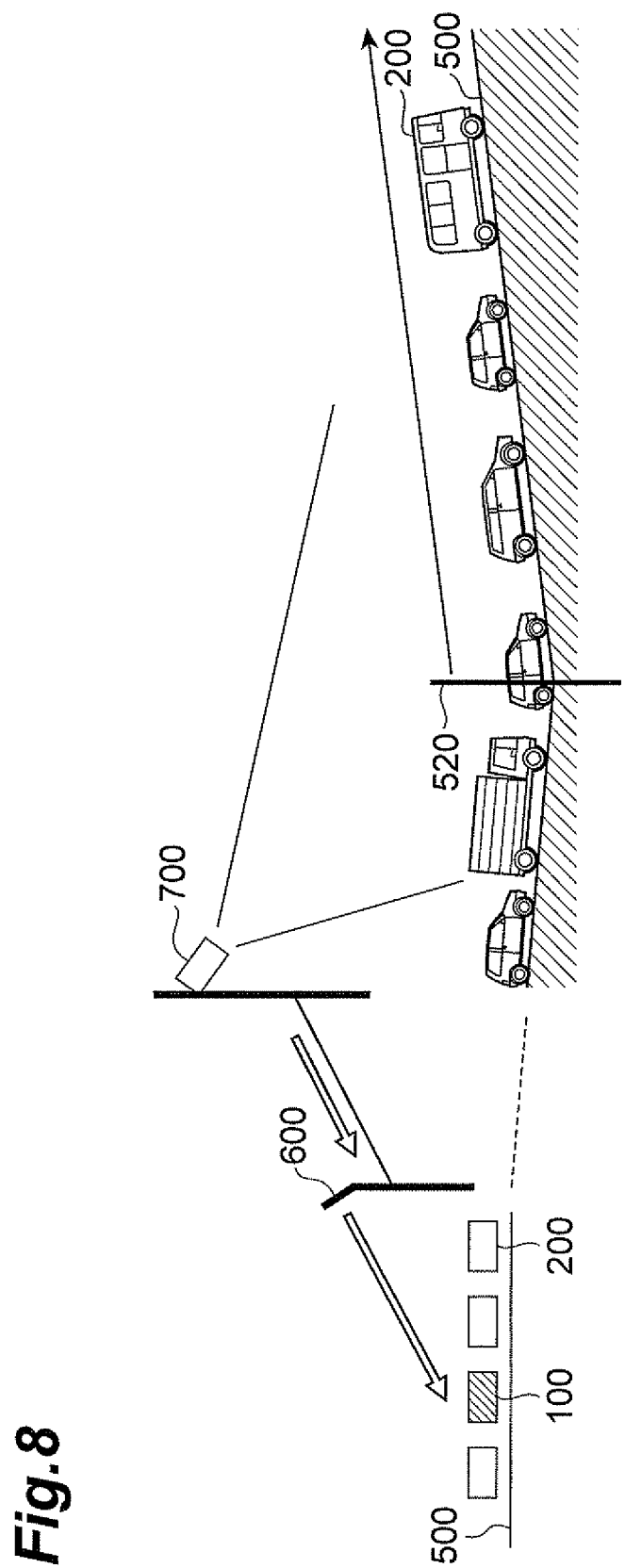
FIG. 8 is a side view showing a method of predicting the number of ordinary vehicles.
Figure 9:
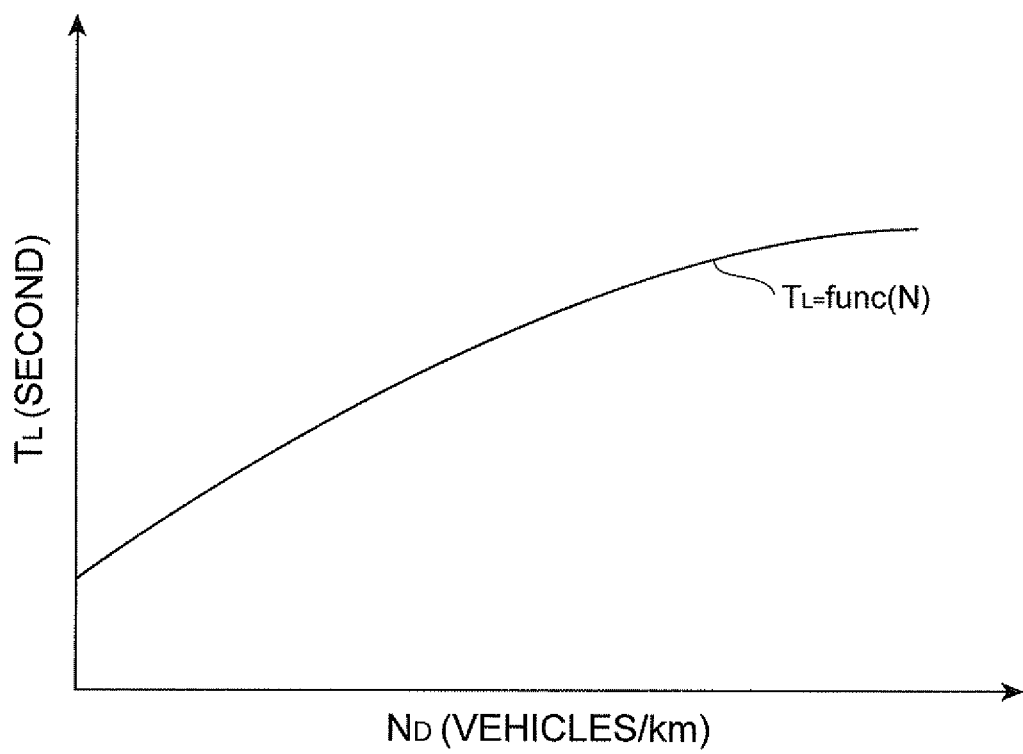
FIG. 9 is a graph showing a function of obtaining a target inter-vehicle time for which speed reduction propagation is absorbed.

When the penetration of the system-mounted vehicle 100 is slightly smaller than the ordinary vehicle 200, as shown in FIG. 8, a road-side fixed camera 700 is installed at the sag 520, at which congestion occurs, to measure a traffic density $N_D$ [vehicles/km]. The traffic density $N_D$ measured by the road-side camera 700 is transferred to the system-mounted vehicle 100 traveling several km from the sag 520 through an optical beacon communication unit 600 of the road facility. The system-mounted vehicle 100 to which the traffic density $N_D$ is transferred calculates the target inter-vehicle time $T_L$ by mapping the function of the target inter-vehicle time $T_L$ [seconds] to the traffic density $N_D$ shown in FIG. 9 obtained by the simulation in advance, and sets a target inter-vehicle distance L.

Alternatively, when setting an inter-vehicle distance necessary for absorbing speed reduction propagation, the system-mounted vehicle 100 may monitor the behavior of the ordinary vehicle 200, may transfer the speed reduction start position and the deceleration of the preceding vehicle to the succeeding system-mounted vehicle 100, may set an appropriate inter-vehicle distance, and may request rapid speed reduction.

Figure 10:
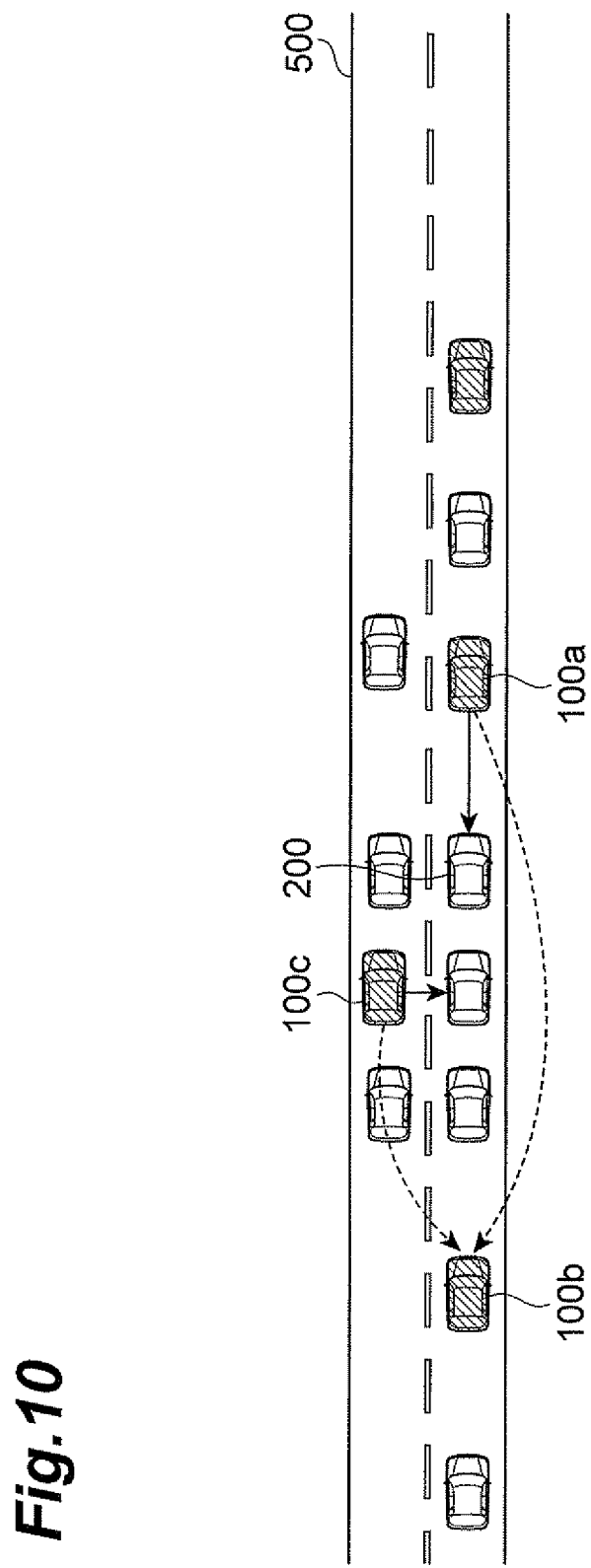
FIG. 10 is a plan view showing an operation when the behavior of an ordinary vehicle is monitored.

As shown in FIG. 10, a system-mounted vehicle 100a traveling in front of an ordinary vehicle 200 and a system-mounted vehicle 100c traveling laterally to the ordinary vehicle 200 monitor the behavior of the ordinary vehicle 200 using a radar (millimeter-wave radar or laser radar) 32, which is a surrounding recognition sensor of an autonomous system, an image recognition camera, or the like. With regard to the behavior of the ordinary vehicle 200, the speed reduction start position, the deceleration, the minimum speed, and the like are used. The system-mounted vehicles 100a and 100c transfer the behavior of the ordinary vehicle 200 to the succeeding system-mounted vehicle 100b using the vehicle-to-vehicle communication unit 12.

The assumed number of ordinary vehicles 200 between the preceding system-mounted vehicle 100a and the last system-mounted vehicle 100b changes from the difference between the conditions assumed by the above-described pre-simulation and the conditions obtained by the above-described monitoring, thereby changing the necessary inter-vehicle distance L to be adjusted to the actual situation.

Figure 11:
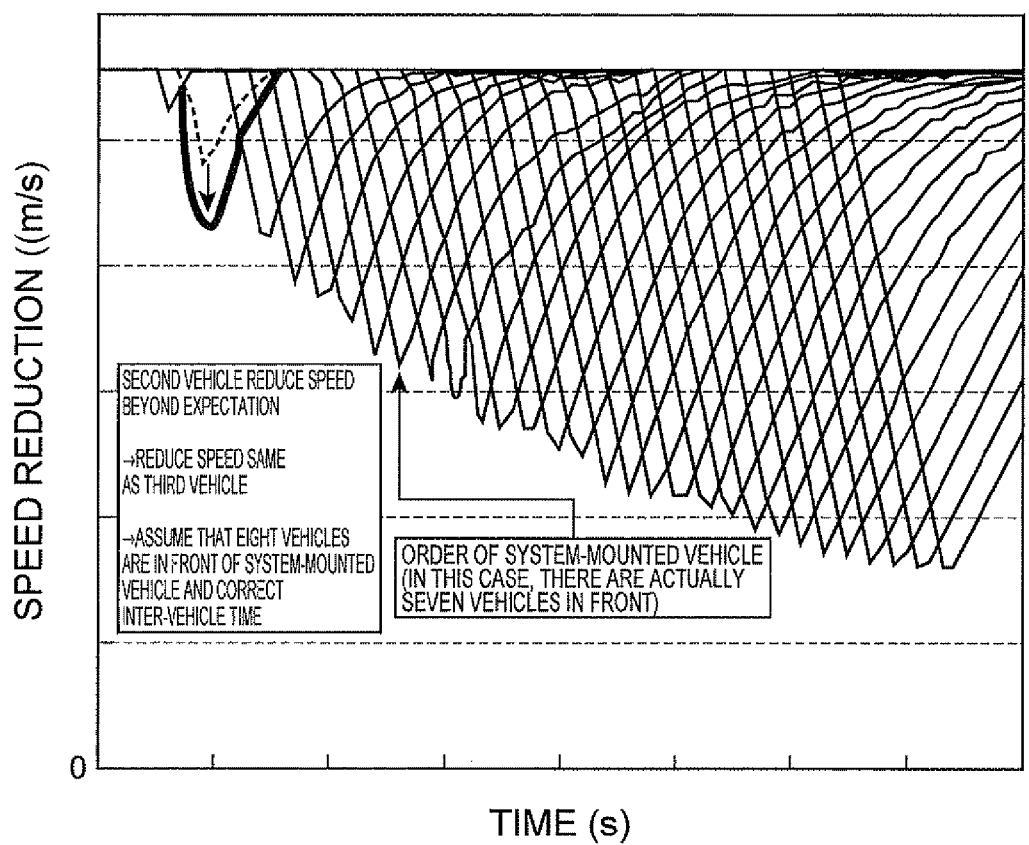
FIG. 11 is a graph showing an example where a motion of a preceding vehicle beyond the scope of the assumption is addressed.

A case where a preceding vehicle is beyond the scope of the assumption from the pre-simulation will be described. In this case, for example, as shown in FIG. 11, when the second ordinary vehicle 200 reduces speed beyond expectation and then reduces speed to be the same as the predicted third vehicle, even though seven ordinary vehicles 200 are actually traveling in front of the system-mounted vehicle 100, the ECU 20 of the system-mounted vehicle 100 corrects the inter-vehicle time and changes the necessary inter-vehicle distance L assuming that eight ordinary vehicles 200, one more than the seven vehicles, are traveling in front.

Figure 12:
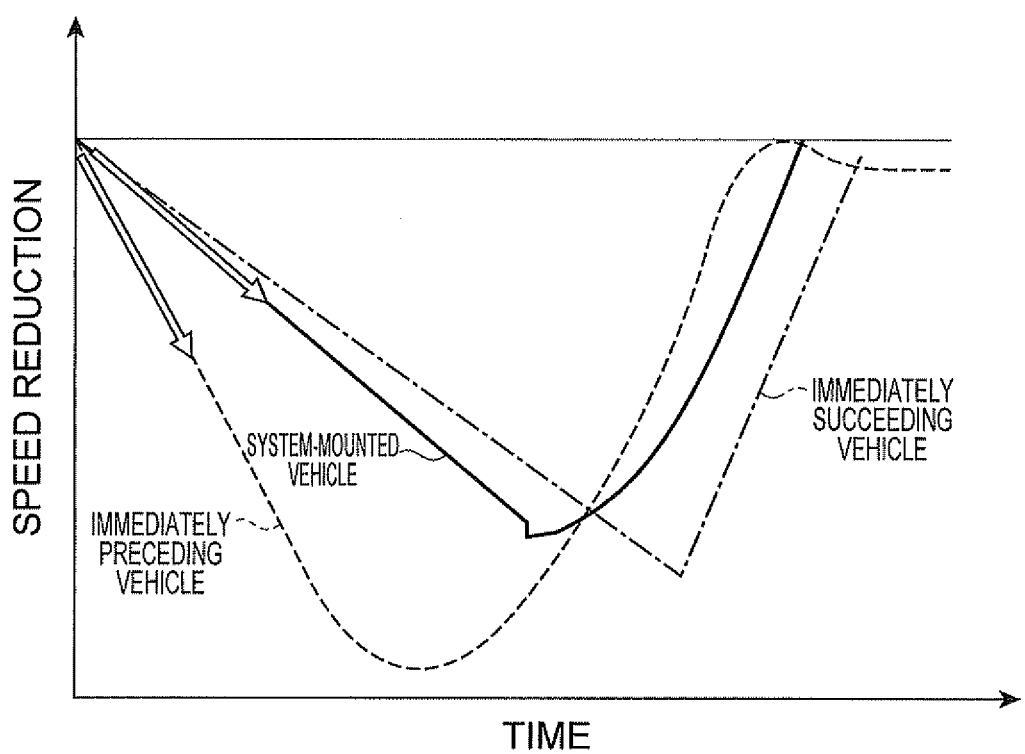
FIG. 12 is a graph showing an operation to absorb speed reduction propagation when a vehicle having the device of the embodiment mounted therein reduces speed while closing an inter-vehicle distance at a deceleration lower than a vehicle in front of an immediately preceding vehicle.

Hereinafter, a basic way of thinking about the absorption of the speed reduction propagation will be described. As shown in FIG. 12, in this embodiment, the system-mounted vehicle 100 reduces speed at a deceleration lower than the immediately preceding vehicle while closing the inter-vehicle distance from the preceding vehicle. The system-mounted vehicle 100 generates a low deceleration $\alpha_t$ by multiplying a given ratio k to a deceleration $\alpha_{pre}$ of the immediately preceding vehicle. The deceleration $\alpha_t$ can be $\alpha_t = k \cdot \alpha_{pre}$ (0<k<1).

Control parameters for absorbing speed reduction propagation are determined taking into consideration the following items in principle.

Figure 13:
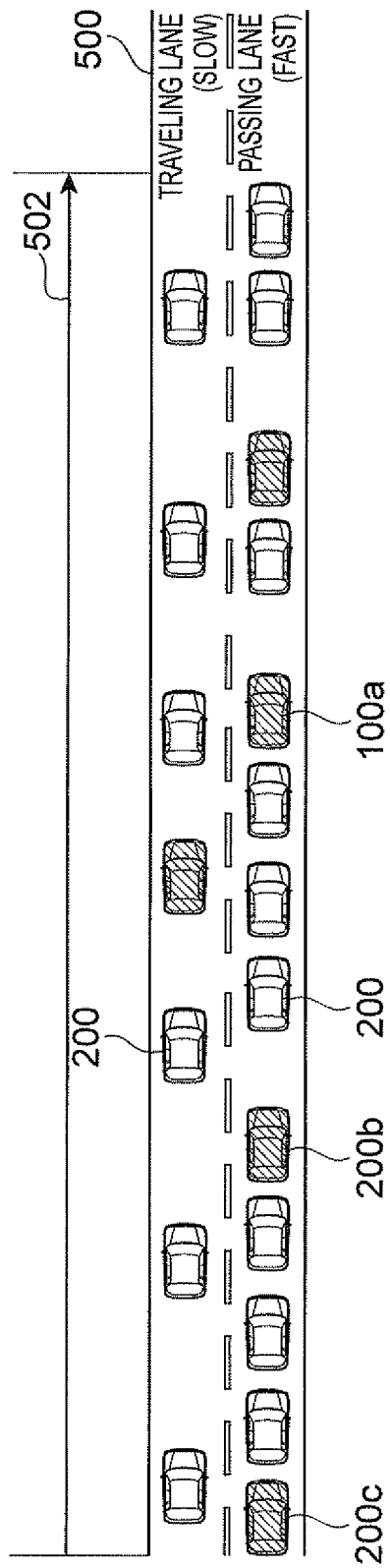
FIG. 13 is a plan view showing an operation when information relating to speed reduction of a host vehicle is transmitted to a succeeding vehicle.
Figure 14:
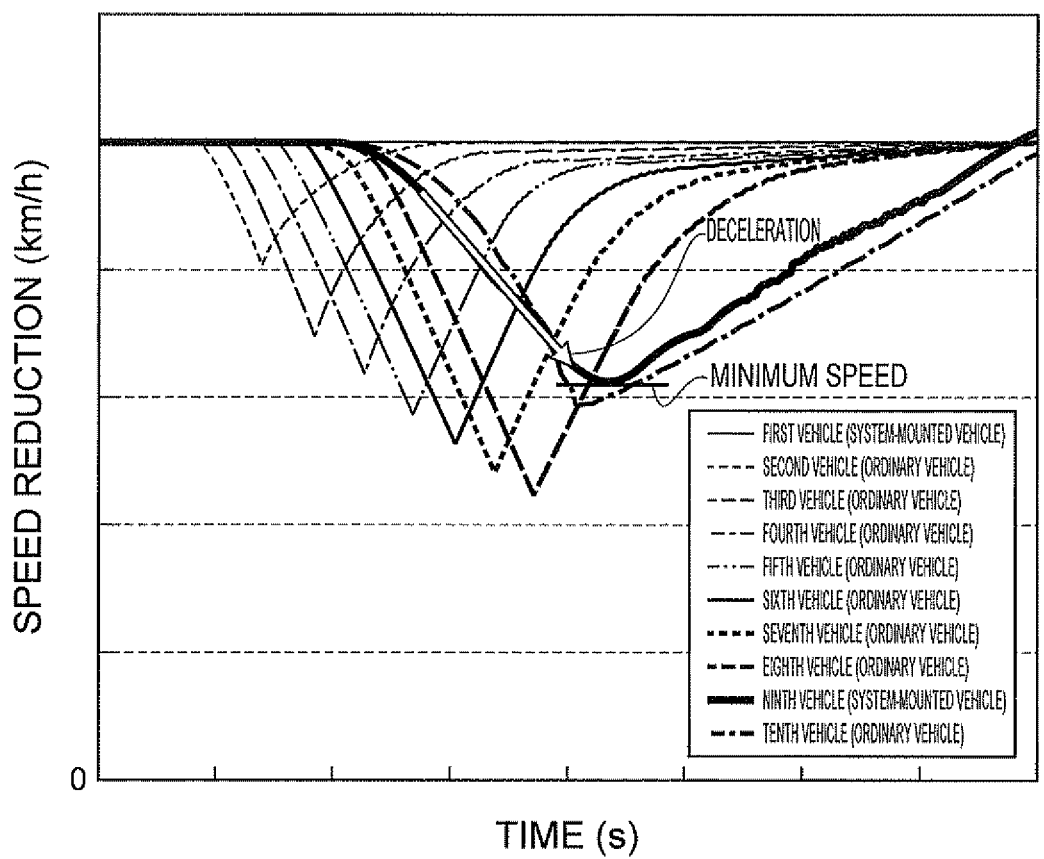
FIG. 14 is a graph showing an operation when information relating to speed reduction of a host vehicle is transmitted to a succeeding vehicle.

(1) minimum speed at the time of speed reduction: immediately preceding vehicle<immediately succeeding vehicle<system-mounted vehicle (2) minimum inter-vehicle distance at the time of speed reduction propagation absorption: 1.3 [seconds], which is the same as the ACC shortest inter-vehicle time (3) maximum relative speed with respect to the immediately preceding vehicle is equal to or lower than a threshold value: threshold value is 30 km/h or is set in accordance with the humanly allowable range (4) maximum deceleration: lower than the immediately preceding vehicle When the deceleration of the preceding vehicle is high, as shown in FIG. 13, the system-mounted vehicle 100b may predict the deceleration and the minimum speed of the host vehicle, and may transmit the deceleration and the minimum speed to the succeeding system-mounted vehicle 100c by the vehicle-to-vehicle communication unit 12, thereby requesting the succeeding system-mounted vehicle 100c to set an appropriate inter-vehicle distance and to perform rapid speed reduction. In this case, the deceleration and the minimum speed of the system-mounted vehicle 100b can be predicted as shown in FIG. 14.

Figure 15:
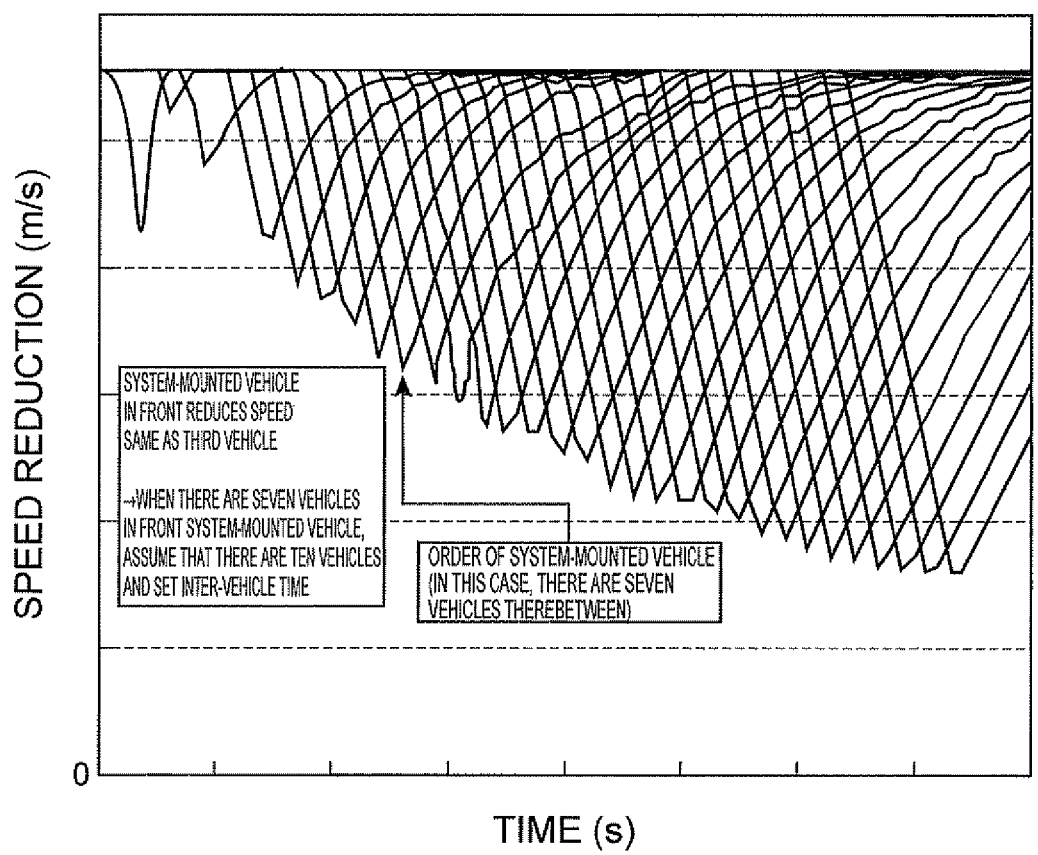
FIG. 15 is a graph showing an example where a motion of a preceding vehicle beyond the scope of the assumption is addressed.

When the system-mounted vehicle 100b reduces speed unexpectedly, for example, as shown in FIG. 15, reduces speed to be the same as the predicted third vehicle, even though seven vehicles are actually traveling in front, the succeeding system-mounted vehicle 100c corrects the inter-vehicle time assuming that ten vehicles, three more than the seven vehicles, are traveling in front.

In this embodiment described above, on the basis of the prediction information of the speed reduction propagation when the preceding vehicle in front of the host vehicle reduces speed, such that other vehicles between the preceding vehicle and the system-mounted vehicle 100 successively reduces speed, and the system-mounted vehicle 100 then reduces speed, the ECU 20 and the ACC 30 control the traveling of the system-mounted vehicle 100 such that the system-mounted vehicle 100 and the ordinary vehicle 200 immediately in front of the system-mounted vehicle 100 have a predetermined relative positional relationship. Therefore, it is possible to suppress the speed reduction propagation between the preceding vehicle and the system-mounted vehicle 100 in advance, making it possible to more effectively suppress congestion.

In particular, in this embodiment, the information relating to the speed reduction of the preceding vehicle can be received from the system-mounted vehicle 100a serving as the preceding vehicle by the vehicle-to-vehicle communication unit 12. Therefore, it is possible to know the movement of the preceding vehicle before the speed reduction propagation occurs, and with the cooperation of the system-mounted vehicle 100a serving as the preceding vehicle and the system-mounted vehicle 100b serving as the host vehicle, it becomes possible to more effectively suppress congestion.

According to this embodiment, on the basis of the deceleration of other vehicle between the preceding vehicle and the system-mounted vehicle 100, the ECU 20 and the ACC 30 perform switching from control such that the preceding vehicle and the system-mounted vehicle 100 have the predetermined relative positional relationship to control such that the inter-vehicle distance from another vehicle immediately in front of the system-mounted vehicle 100 is maintained at a predetermined distance. Therefore, when the ordinary vehicle 200 traveling immediately in front reduces speed beyond the scope of the assumption, it is possible to appropriately maintain the inter-vehicle distance.

According to this embodiment, when the speed reduction of the preceding vehicle is detected, the ECU 20 and the ACC 30 control the traveling of the system-mounted vehicle 100 such that the system-mounted vehicle 100 reduces speed at a deceleration lower than the preceding vehicle. Therefore, it is possible to absorb the speed reduction propagation between the preceding vehicle and the system-mounted vehicle 100, making it possible to more effectively suppress congestion.

According to this embodiment, the information relating to the speed reduction of the host vehicle can be transmitted to the succeeding vehicle behind the host vehicle by the vehicle-to-vehicle communication unit 12. Therefore, the succeeding vehicle uses the information relating to the speed reduction of the host vehicle, thereby more effectively suppressing the occurrence of congestion due to the speed reduction propagation.

Figure 16:
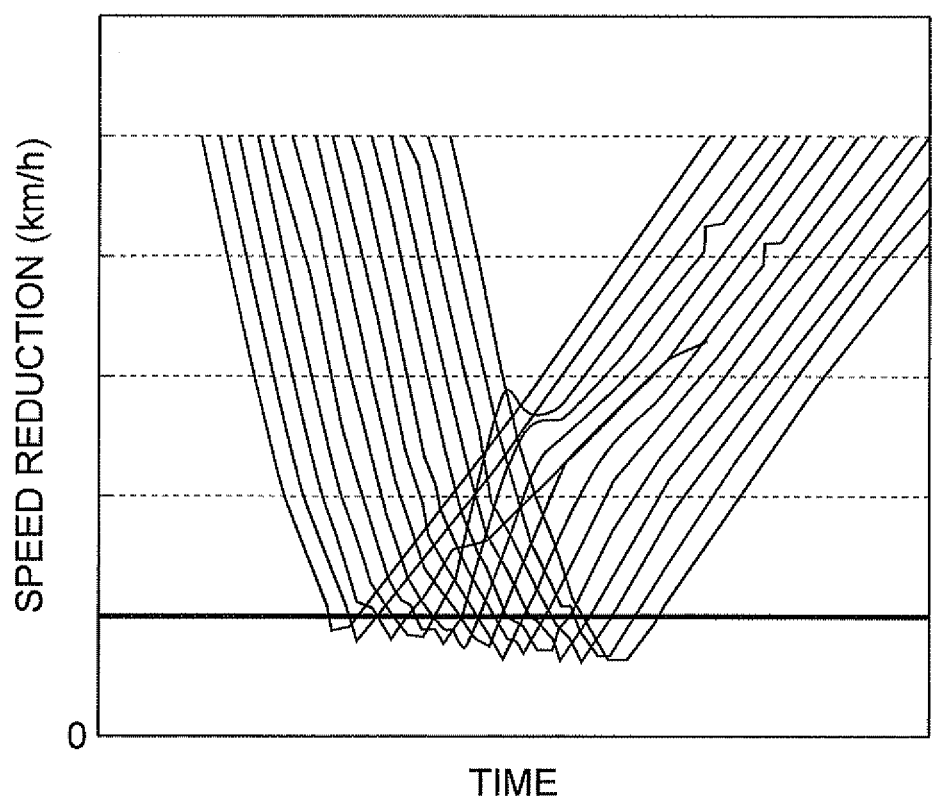
FIG. 16 is a graph showing a change in speed near a congestion start time due to an ordinary vehicle.
Figure 17:
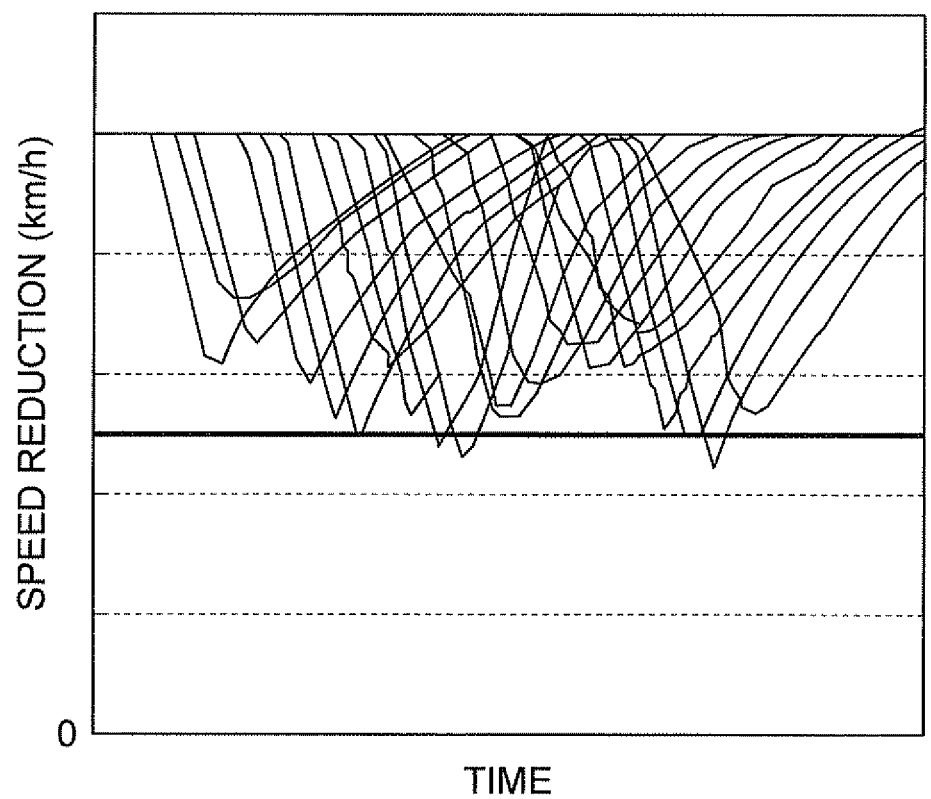
FIG. 17 is a graph showing a change in speed near a congestion start time when speed reduction propagation is absorbed.

According to the vehicle control device of this embodiment described above, the device of this embodiment improves the minimum speed which decreases due to speed reduction propagation such that there is a form of the speed reduction propagation at the same congestion start time in the ordinary vehicle shown in FIG. 16 and the system-mounted vehicle shown in FIG. 17, making it possible to suppress a decrease in speed. That is, according to this embodiment, it becomes possible to delay the congestion start time.

Figure 18:
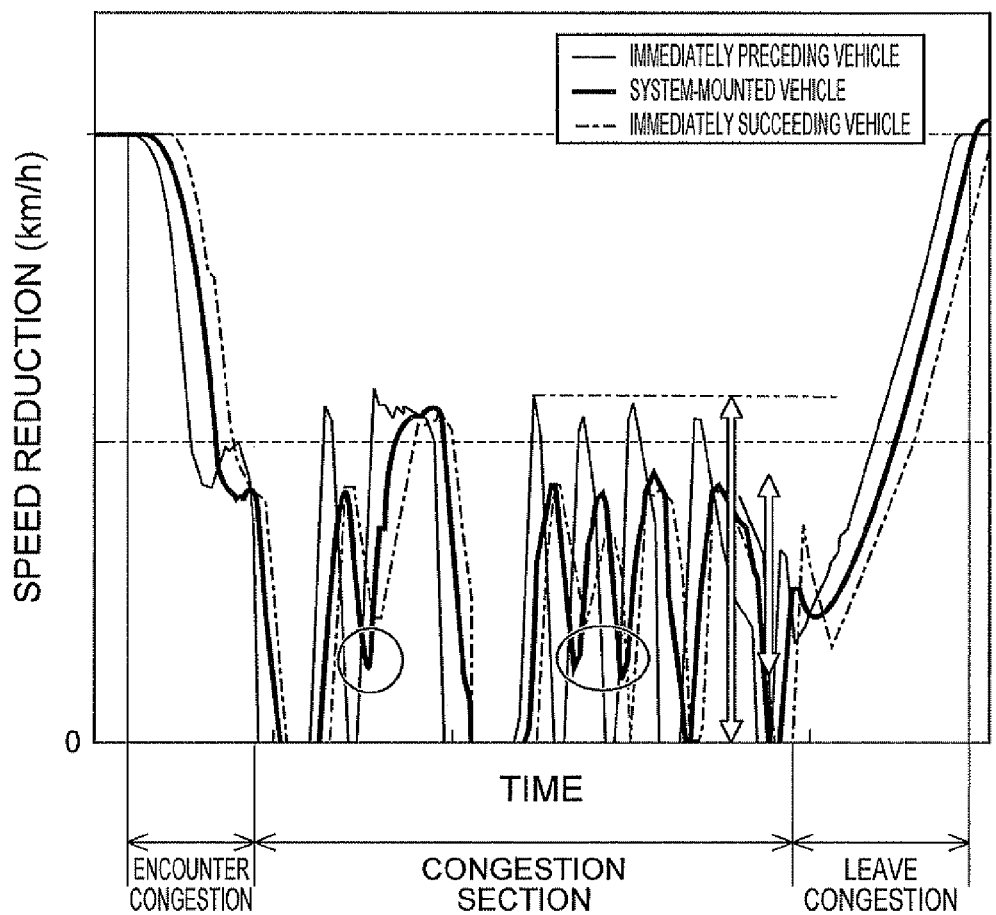
FIG. 18 is a graph showing the effects of this embodiment.

According to this embodiment, as shown in FIG. 18, the range of change in speed or the number of times of stopping decreases during congestion as well as at the time of the start, of congestion.

Although the embodiment of the invention has been described, the invention is not limited to the foregoing embodiment, and various modifications may be made. For example, although in the foregoing embodiment, description has been provided focusing on a form in which a vehicle control device mounted in an individual system-mounted vehicle performs vehicle control so as to prevent congestion, for example, a vehicle control device may be disposed only in a management center, and a command from the management center may be transmitted to an individual vehicle by communication, thereby performing vehicle control so as to prevent congestion.

INDUSTRIAL APPLICABILITY

According to the invention, even when the number of system-mounted vehicles in which the vehicle control device of the invention is mounted is not great, it becomes possible to more effectively suppress congestion.

REFERENCE SIGNS LIST

10: vehicle control device
12: vehicle-to-vehicle communication unit
14: road-to-vehicle communication unit
16: navigation system
20: ECU
30: ACC
32: radar
100, 100a, 100b, 100c: system-mounted vehicle
200: ordinary vehicle
500: road
501: downhill
502: uphill
520: sag
600: optical beacon communication unit
700: road-side fixed camera

The invention claimed is:

1. A vehicle control device comprising:
an information acquisition unit which acquires prediction information of speed reduction propagation when a preceding vehicle in front of a host vehicle has a speed reduction, the preceding vehicle being capable of wirelessly communicating with the host vehicle, the prediction information including prediction how other vehicles between the preceding vehicle and the host vehicle would successively reduce speed, and how the host vehicle would then reduce speed; and
a traveling control unit which controls traveling of the host vehicle based on the prediction information such that (1) a distance between the host vehicle and another vehicle immediately in front of the host vehicle is an inter-vehicle distance capable of absorbing the speed reduction propagation before or after the speed reduction of the preceding vehicle, and (2) when the another vehicle reduces speed, the host vehicle has a speed reduction at a deceleration lower than a deceleration of the another vehicle, the another vehicle being one of the other vehicles between the preceding vehicle and the host vehicle.

2. The vehicle control device according to claim 1, further comprising:
a receiving unit which receives information relating to the speed reduction of the preceding vehicle from the preceding vehicle.

3. The vehicle control device according to claim 1,
wherein, when the speed reduction of the preceding vehicle is detected, the traveling control unit controls the traveling of the host vehicle such that the host vehicle reduces speed at a deceleration lower than a deceleration of the preceding vehicle.

4. The vehicle control device according to claim 3, further comprising:
a transmitting unit which transmits information relating to the speed reduction of the host vehicle to a succeeding vehicle behind the host vehicle.

5. A vehicle control method comprising the steps of:
acquiring prediction information of speed reduction propagation when a preceding vehicle in front of a host vehicle has a speed reduction, the preceding vehicle being capable of wirelessly communicating with the host vehicle, the prediction information including prediction how other vehicles between the preceding vehicle and the host vehicle would successively reduce speed, and how the host vehicle would then reduce speed; and
controlling traveling of the host vehicle based on the prediction information such that (1) a distance between the host vehicle and another vehicle immediately in front of the host vehicle is an inter-vehicle distance capable of absorbing the speed reduction propagation and (2) when the another vehicle reduces speed, the host vehicle has a speed reduction at a deceleration lower than a deceleration of the another vehicle, the another vehicle being one of the other vehicles between the preceding vehicle and the host vehicle.

6. The vehicle control method according to claim 5, further comprising the step of:
receiving information relating to the speed reduction of the preceding vehicle from the preceding vehicle.

7. The vehicle control method according to claim 5,
wherein, in the step of controlling the traveling of the host vehicle, when the speed reduction of the preceding vehicle is detected, the traveling of the host vehicle is controlled such that the host vehicle reduces speed at a deceleration lower than a deceleration of the preceding vehicle.

8. The vehicle control method according to claim 7, further comprising the step of:
transmitting information relating to the speed reduction of the host vehicle to a succeeding vehicle behind the host vehicle.

9. A vehicle control system comprising:
an information acquisition unit which acquires prediction information of speed reduction propagation when a preceding vehicle in front of a host vehicle has a speed reduction, the preceding vehicle being capable of wirelessly communicating with the host vehicle, the prediction information including prediction how other vehicles between the preceding vehicle and the host vehicle would successively reduce speed, and how the vehicle would then reduce speed; and
a traveling control unit which controls traveling of the host vehicle based on the prediction information such that (1) a distance between the host vehicle and another vehicle immediately in front of the host vehicle is an inter-vehicle distance capable of absorbing the speed reduction propagation and (2) when the another vehicle reduces speed, the host vehicle has a speed reduction at a deceleration lower than a deceleration of the another vehicle, the another vehicle being one of the other vehicles between the preceding vehicle and the host vehicle.

10. The vehicle control system according to claim 9, further comprising:
a receiving unit which receives information relating to the speed reduction of the preceding vehicle from the preceding vehicle.

11. The vehicle control system according to claim 9,
wherein, when the speed reduction of the preceding vehicle is detected, the traveling control unit controls the traveling of the host vehicle such that the host vehicle reduces speed at a deceleration lower than a deceleration of the preceding vehicle.

12. The vehicle control system according to claim 11, further comprising:
a transmitting unit which transmits information relating to the speed reduction of the host vehicle to a succeeding vehicle behind the vehicle.

* * * * *